United States Patent [19]
Blake et al.

[11] Patent Number: 5,752,038
[45] Date of Patent: May 12, 1998

[54] METHOD AND SYSTEM FOR DETERMINING AN OPTIMAL PLACEMENT ORDER FOR CODE PORTIONS WITHIN A MODULE

[75] Inventors: Russ Blake, Carnation; M. Reza Baghai, Redmond; Lee A. Smith, Seattle, all of Wash.

[73] Assignee: Microsoft Corporation, Redmind, Wash.

[21] Appl. No.: 903,323

[22] Filed: Jul. 17, 1997

Related U.S. Application Data

[63] Continuation of Ser. No. 214,642, Mar. 16, 1994, abandoned.

[51] Int. Cl.⁶ .................................................. G06F 9/45
[52] U.S. Cl. .................................................. 395/709
[58] Field of Search .................................. 395/705, 707, 395/709

[56] References Cited

U.S. PATENT DOCUMENTS

| | | | |
|---|---|---|---|
| 4,571,678 | 2/1986 | Chaitin | 395/700 |
| 5,212,794 | 5/1993 | Pettis et al. | 395/700 |
| 5,367,684 | 11/1994 | Smith | 395/700 |
| 5,440,742 | 8/1995 | Schwanke | 395/650 |
| 5,457,799 | 10/1995 | Srivastava | 395/700 |
| 5,519,867 | 5/1996 | Moeller et al. | 395/700 |

Primary Examiner—Emanuel Todd Voeltz
Assistant Examiner—Peter J. Corcoran, III
Attorney, Agent, or Firm—Seed and Berry LLP

[57] ABSTRACT

A method and system for determining an optimal placement order for code portions within a module to improve locality of reference and reduce the working set of the module are provided. The optimal placement order for code portions within a module reflects the concurrency of usage for code portions during execution of the module. All code portions which execute within a certain period of time are placed in close proximity to each other within the executable module. When determining the optimal placement order for each code portion, the present invention executes an instrumented version of the module to collect execution data for each code portion, analyzes the execution data to determine the optimal placement order for each code portion, and links the code portions according to the determined optimal placement order. The instrumented version of the module contains instructions that, when executed, cause execution data to be recorded. When the code portions are linked according to the determined optimal placement order, the working set for the module is reduced, thereby lessening page and cache misses and improving overall system performance. To collect execution data, a preferred embodiment of the present invention creates a bit vector for each code portion in the module. Each bit vector contains multiple bits such that each bit represents a unique time interval. Upon each invocation of a code portion within a time interval, the bit vector for the invoked code portion is located and the bit that represents the time interval is set to 1.

23 Claims, 12 Drawing Sheets

|     | T0 | T1 | T2 | T3 | T4 | T5 | T6 | T7 |
| --- | -- | -- | -- | -- | -- | -- | -- | -- |
| CP0 | 1  | 0  | 1  | 1  | 1  | 0  | 0  | 0  |
| CP1 | 0  | 0  | 1  | 1  | 1  | 1  | 0  | 0  |
| CP2 | 1  | 0  | 0  | 1  | 1  | 0  | 0  | 0  |
| CP3 | 1  | 1  | 0  | 0  | 0  | 0  | 0  | 0  |
| CP4 | 0  | 1  | 0  | 0  | 1  | 1  | 0  | 0  |
| CP5 | 0  | 1  | 0  | 0  | 1  | 1  | 0  | 0  |
| CP6 | 1  | 1  | 1  | 1  | 1  | 1  | 0  | 0  |
| CP7 | 1  | 1  | 1  | 0  | 0  | 0  | 0  | 0  |
| CP8 | 0  | 1  | 0  | 0  | 1  | 1  | 0  | 0  |

|     | T0 | T1 | T2 | T3 | T4 | T5 | T6 | T7 |
|-----|----|----|----|----|----|----|----|----|
| CP6 | 1  | 1  | 1  | 1  | 1  | 1  | 0  | 0  |
| CP7 | 1  | 1  | 1  | 0  | 0  | 0  | 0  | 0  |
| CP3 | 1  | 1  | 0  | 0  | 0  | 0  | 0  | 0  |
| CP0 | 1  | 0  | 1  | 1  | 1  | 0  | 0  | 0  |
| CP2 | 1  | 0  | 0  | 1  | 1  | 0  | 0  | 0  |
| CP4 | 0  | 1  | 0  | 0  | 1  | 1  | 0  | 0  |
| CP5 | 0  | 1  | 0  | 0  | 1  | 1  | 0  | 0  |
| CP8 | 0  | 1  | 0  | 0  | 1  | 1  | 0  | 0  |
| CP1 | 0  | 0  | 1  | 1  | 1  | 1  | 0  | 0  |

FIG. 7

|     | T0 | T1 | T2 | T3 | T4 | T5 |
|-----|----|----|----|----|----|----|
| CP6 | 1  | 1  | 1  | 1  | 1  | 1  |
| CP7 | 1  | 1  | 1  | 0  | 0  | 0  |
| CP3 | 1  | 1  | 0  | 0  | 0  | 0  |
| CP0 | 1  | 0  | 1  | 1  | 1  | 0  |
| CP2 | 1  | 0  | 0  | 1  | 1  | 0  |
| CP8 | 0  | 1  | 0  | 0  | 1  | 1  |
| CP1 | 0  | 0  | 1  | 1  | 1  | 1  |

FIG. 8

|     | CP6 | CP7 | CP3 | CP0 | CP2 | CP8 | CP1 |
|-----|-----|-----|-----|-----|-----|-----|-----|
| CP6 | 6   | 149 | 101 | 197 | 149 | 148 | 195 |
| CP7 | 167 | 3   | 101 | 113 | 65  | 64  | 69  |
| CP3 | 125 | 107 | 2   | 71  | 65  | 64  | 27  |
| CP0 | 209 | 107 | 59  | 4   | 149 | 64  | 153 |
| CP2 | 167 | 65  | 59  | 155 | 3   | 64  | 111 |
| CP8 | 167 | 65  | 59  | 71  | 65  | 3   | 111 |
| CP1 | 209 | 65  | 17  | 155 | 107 | 106 | 4   |

|     | CP6  | CP7 | CP3 | CP0  | CP2 | CP8 | CP1 |
|-----|------|-----|-----|------|-----|-----|-----|
| CP6 | 6    | 149 | 101 | -197 | 149 | 148 | 195 |
| CP7 | 167  | 3   | 101 | 113  | 65  | 64  | 69  |
| CP3 | 125  | 107 | 2   | 71   | 65  | 64  | 27  |
| CP0 | -209 | 107 | 59  | 4    | 149 | 64  | 153 |
| CP2 | 167  | 65  | 59  | 155  | 3   | 64  | 111 |
| CP8 | 167  | 65  | 59  | 71   | 65  | 3   | 111 |
| CP1 | 209  | 65  | 17  | 155  | 107 | 106 | 4   |

|     | CP6  | CP7 | CP3 | CP0  | CP2 | CP8 | CP1  |
|-----|------|-----|-----|------|-----|-----|------|
| CP6 | 6    | 149 | 101 | -197 | 149 | 148 | 195  |
| CP7 | 167  | 3   | 101 | 113  | 65  | 64  | 69   |
| CP3 | 125  | 107 | 2   | 71   | 65  | 64  | 27   |
| CP0 | -209 | 107 | 59  | 4    | 149 | 64  | -153 |
| CP2 | 167  | 65  | 59  | 155  | 3   | 64  | 111  |
| CP8 | 167  | 65  | 59  | 71   | 65  | 3   | 111  |
| CP1 | 209  | 65  | 17  | -155 | 107 | 106 | 4    |

|     | CP6  | CP7 | CP3 | CP0  | CP2 | CP8 | CP1  |
|-----|------|-----|-----|------|-----|-----|------|
| CP6 | 6    | 149 | 101 | -197 | 149 | 148 | -195 |
| CP7 | 167  | 3   | 101 | 113  | 65  | 64  | 69   |
| CP3 | 125  | 107 | 2   | 71   | 65  | 64  | 27   |
| CP0 | -209 | 107 | 59  | 4    | 149 | 64  | -153 |
| CP2 | 167  | 65  | 59  | 155  | 3   | 64  | 111  |
| CP8 | 167  | 65  | 59  | 71   | 65  | 3   | 111  |
| CP1 | -209 | 65  | 17  | -155 | 107 | 106 | 4    |

|     | CP6  | CP7 | CP3 | CP0  | CP2  | CP8 | CP1  |
|-----|------|-----|-----|------|------|-----|------|
| CP6 | 6    | 149 | 101 | -197 | -149 | 148 | -195 |
| CP7 | 167  | 3   | 101 | 113  | 65   | 64  | 69   |
| CP3 | 125  | 107 | 2   | 71   | 65   | 64  | 27   |
| CP0 | -209 | 107 | 59  | 4    | 149  | 64  | -153 |
| CP2 | -167 | 65  | 59  | 155  | 3    | 64  | 111  |
| CP8 | 167  | 65  | 59  | 71   | 65   | 3   | 111  |
| CP1 | -209 | 65  | 17  | -155 | 107  | 106 | 4    |

*FIG. 12D*

| | |
|---|---|
| 1 | CP6 |
| 2 | CP0 |
| 3 | CP1 |
| 4 | CP2 |
| 5 | CP7 |
| 6 | CP8 |
| 7 | CP3 |

*FIG. 13A*

| | |
|---|---|
| 1 | CP6 |
| 2 | CP0 |
| 3 | CP1 |
| 4 | CP2 |
| 5 | CP7 |
| 6 | CP4 |
| 7 | CP5 |
| 8 | CP8 |
| 9 | CP3 |

*FIG. 13B*

METHOD AND SYSTEM FOR DETERMINING AN OPTIMAL PLACEMENT ORDER FOR CODE PORTIONS WITHIN A MODULE

CROSS-REFERENCE TO RELATED APPLICATION

This application is a file-wrapper continuation of U.S. patent application Ser. No. 08/214,642, filed Mar. 16, 1994, now abandoned.

TECHNICAL FIELD

The present invention relates generally to a method and system for reducing the size of a code module's working set, and particularly, to a method and system for determining an optimal placement order for code portions within a module so that when the module is executed, a minimal amount of page swapping occurs.

BACKGROUND OF THE INVENTION

Many conventional computer systems utilize vital memory. Virtual memory refers to a set of techniques that provide a logical address space that is typically larger than the corresponding physical address space of the computer system. One of the primary benefits of using virtual memory is that it facilitates the execution of a program without the need for all of the program to be resident in main memory during execution. Rather, certain portions of the program may reside in secondary memory for part of the execution of the program. A common technique for implementing virtual memory is paging; a less popular technique is segmentation. Because most conventional computer systems utilize paging instead of segmentation, the following discussion refers to a paging system, while noting these techniques can be applied to segmentation systems as well.

When paging is used, the logical address space is divided into a number of fixed-size blocks, known as pages. The physical address space is divided into like-sized blocks, known as page frames. A paging mechanism maps the pages from the logical address space, for example, secondary memory, into the page frames of the physical address space, for example, main memory. When the computer system attempts to reference an address on a page that is not present in main memory, a page fault occurs. After a page fault occurs, the operating system must copy the required page into main memory from secondary memory and then restart the instruction that caused the fault.

One paging model that is commonly used is the working set model. At any instance in time, t, there exists a working set, w(k, t), consisting of all the pages used by the k most recent memory references. The operating system monitors the working set of each process and allocates each process enough page frames to contain the process' working set. If the working set is larger than the allocated page frames, the system will be prone to thrashing. Thrashing refers to very high paging activity wherein pages are regularly being swapped from secondary memory into the pages frames allocated to a process. This behavior has a very high time and computational overhead. It is therefore desirable to reduce the size of (ie., the number of pages in) a program's working set to lessen the likelihood of thrashing and significantly improve system performance.

A programmer typically writes source code without any concern for how the code will be divided into pages when it is executed. Similarly, a compiler program translates the source code into relocatable machine instructions and stores the instructions as object code in the order in which the compiler encounters the instructions in the source code. The object code therefore reflects the lack of concern for the placement order by the programmer. A linker program then merges related object code together to produce executable code. Again, the liner program has no knowledge or concern for the working set of the resultant executable code. The linker program merely orders the instructions within the executable code in the order in which the instructions are encountered in the object code. These tools do not have the information required to make an optimal placement of code portions within the executable code. This is because the information required can only be obtained by actually executing the executable module and observing its usage of code portions. Clearly this cannot be done before the executable module has been created. The executable module initially created by the compiler and linker thus has code portions laid out without regard to their usage.

As each code portion is executed, the page in which it resides must be loaded into physical memory. Other code portions residing on the same page will also be loaded into memory, even if they are not currently being executed. The result is a collection of pages in memory with some required code portions and some unrequired code portions. To the extent that unrequired code portions are loaded into memory by this process, valuable memory space is wasted, and the total number of pages loaded into memory is much larger than necessary.

SUMMARY OF THE INVENTION

The present invention provides a method and system for determining an optimal placement order for code portions within a module to improve locality of reference and reduce the working set of the module. By reducing the working set of a module, the module will require less memory to execute on a computer system. According to the present invention, the optimal placement order for code portions within a module reflects the concurrency of usage for code portions during execution of the module. That is, all code portions which execute within a certain period of time are placed in close proximity to each other within the executable module. This method of "time ordering" is a simple and effective way to reduce the working set of a module.

When determining the optimal placement order for each code portion, the present invention executes an instrumented version of the module to collect execution data for each code portion, analyzes the execution data to determine the optimal placement order for each code portion, and links the code portions according to the determined optimal placement order. The instrumented version of the module contains instructions that, when executed, cause execution data to be recorded. When the code portions are linked according to the determined optimal placement order, the working set for the module is reduced, thereby lessening page and cache misses and improving overall system performance.

To record execution data, a preferred embodiment of the present invention creates a bit vector for each code portion in the module. Each bit vector contains multiple bits such that each bit represents a unique time interval. Upon each invocation of a code portion within a time interval, the bit vector for the invoked code portion is located and the bit that represents the time interval is set to 1.

BRIEF DESCRIPTION OF THE DRAWINGS

FIG. 7 is a block diagram of the bit vector table of FIG. 4A after the bit vectors are sorted in accordance with a preferred embodiment of the present invention.

FIG. 8 is a block diagram of the bit vector table of FIG. 7 after the bit vectors are compressed in accordance with a preferred embodiment of the present invention.

FIG. 9 is a block diagram of a weight matrix for storing the computed weights for pairs of bit vectors.

FIG. 12A is a block diagram of a weight matrix at a first processing stage in accordance with a preferred embodiment of the present invention.

FIG. 12B is a block diagram of a weight matrix at a second processing stage in accordance with a preferred embodiment of the present invention.

FIG. 12C is a block diagram of a weight matrix at a third processing stage in accordance with a preferred embodiment of the present invention.

FIG. 12D is a block diagram of a weight matrix at a fourth processing stage in accordance with a preferred embodiment of the present invention.

FIGS. 13A is a block diagram of an optimal placement order file before decompression of surrogate code portions.

FIG. 13B is a block diagram of the optimal placement order file after decompression of surrogate code portions.

DETAILED DESCRIPTION

In a preferred embodiment, the present invention provides a method and system for determining an optimal placement order for functions, procedures, routines, or other identifiable code portions within a module to improve locality of reference and reduce the working set of the module. By reducing the working set of a module, the module requires less memory than it normally would require to execute on a computer system. Because of the variability imposed by different operating environments, the difficulty in providing absolute mathematical optimization, etc., the term "optimal" as used in this description refers to steps and elements that provide a greatly improved result relative to the results provided by prior systems. For purposes of this detailed description, the term "module" includes any program or library of routines capable of executing on a computer system. "Placement order" refers to the order in which code portions are placed by a linker program when creating an executable module. According to the present invention, the optimal placement order for code portions within a module reflects the concurrency of usage for code portions during execution of the module. That is, all code portions which execute within a certain period of time are placed in close proximity to each other within the executable module. This method of "time ordering" is a simple and effective way to reduce the working set of a module.

When determining the optimal placement order for each code portion, the present invention 1) executes an instrumented version of the module to collect execution data for each code portion, 2) analyzes the execution data to determine the optimal placement order for each code portion, and 3) links the code portions according to the determined optimal placement order. The instrumented version of the module contains instructions that, when executed, cause execution data to be recorded. When the code portions are linked according to the determined optimal placement order, the working set for the module is reduced, thereby lessening page and cache misses and improving overall system performance.

In modern computer systems, performance is typically improved by including an additional, smaller high-speed memory cache between the primary memory and the processor. Just as equal-sized pages are used to transfer code portions from secondary memory into primary memory, so are equal-sized cache lines used to transfer code portions from primary memory into the cache. This forms an hierarchy of memories for accessing program code: cache, primary memory, and secondary memory, with each level of the hierarchy being successively larger and slower. The improvements of this invention which have been described above by referring to the paging portion of the hierarchy, likewise reduce the number of cache lines needed to hold the module's code portions in the cache during its execution.

Figure 1:
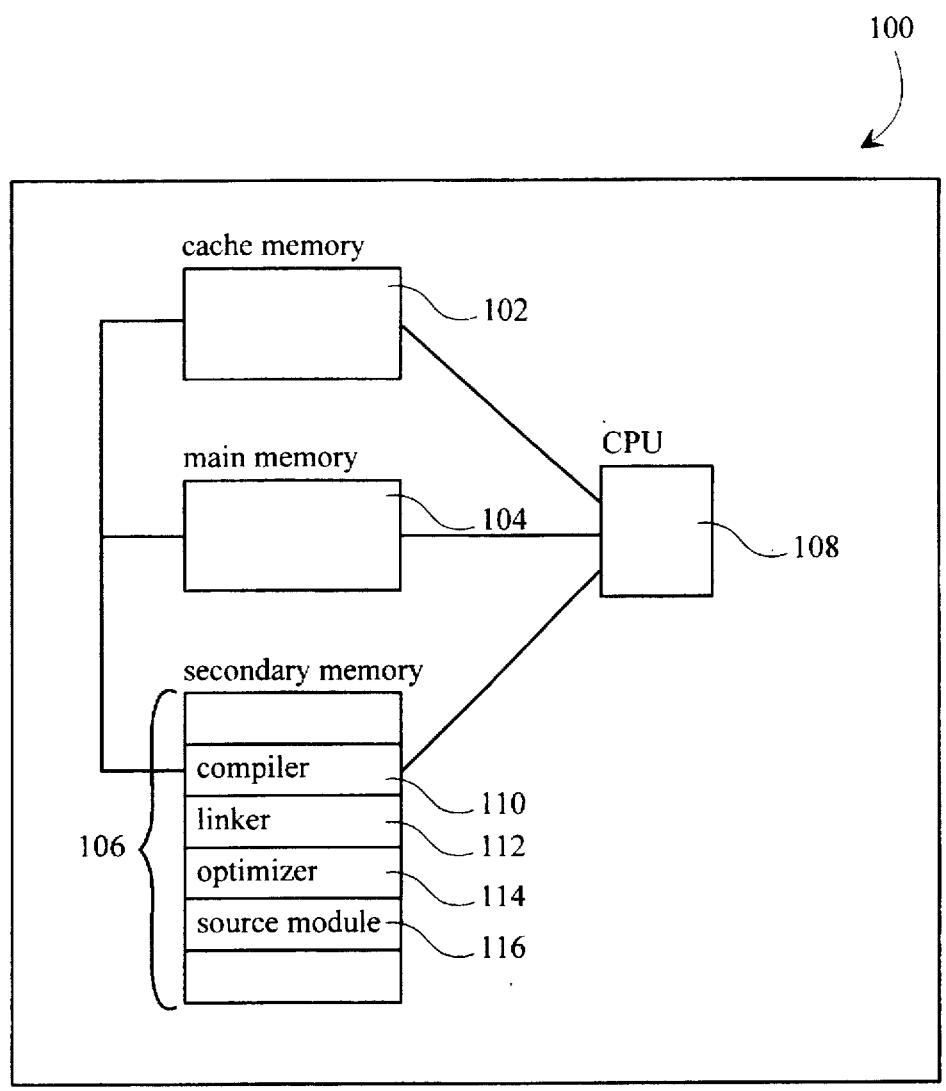
FIG. 1 is a block diagram of a computer system configured to implement a preferred embodiment of the present invention.

FIG. 1 is a block diagram of a computer system 100 configured to implement a preferred embodiment of the present invention. The computer system 100 includes a cache memory 102, a main memory 104, a secondary memory 106, and a central processing unit 108. A compiler program 110, a linker program 112, and an optimizer program 114 are stored within the secondary memory 106, but are loaded into the main memory 104 to be executed. Source modules 116 are also stored within the secondary memory 106. The source module 116 includes multiple code portions written in any higher-level programming language, for example, the C programming language. When executed on the computer system, the compiler program 110 translates the source module into a machine-readable form and stores the resulting code in an object module. The liner program 112 then merges the multiple compiled code portions and resolves any interconnecting references, such as calls to external code portions, and stores the resulting code in an executable module. When the executable module is executed on the computer system 100, the present invention records execution data for each code portion. The execution data preferably includes an indicator of when a code portion is invoked. Alternatively, the execution data may include an indicator of both when a code portion is invoked and when the code portion finishes executing. The optimizer program 114 analyzes the recorded execution data for each code portion to determine the optimal placement order of each code portion.

Figure 2:
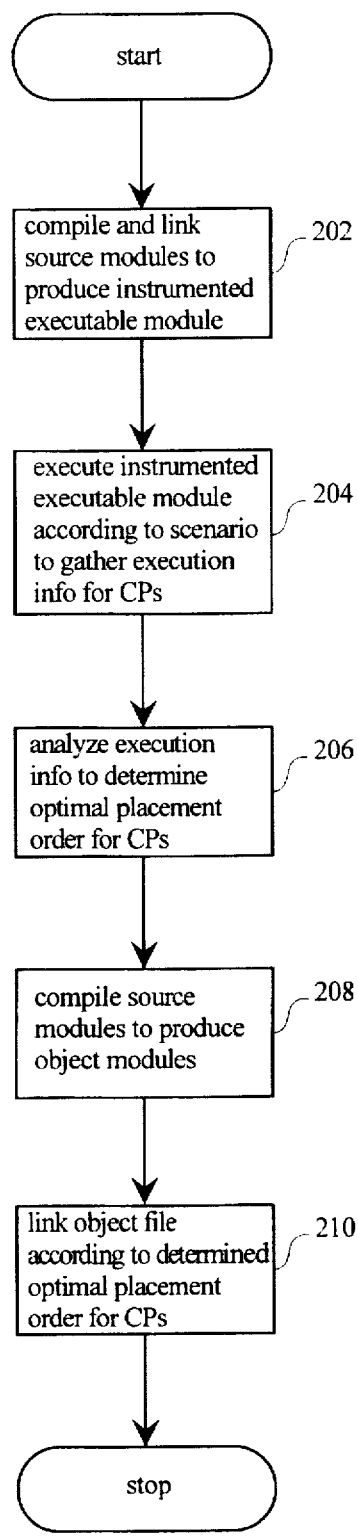
FIG. 2 is an overview flow diagram of a method for determining an optimal placement order for code portions within a source module and reordering the code portions according to the determined optimal placement order to produce an optimized executable module in accordance with a preferred embodiment of the present invention.
Figure 3:
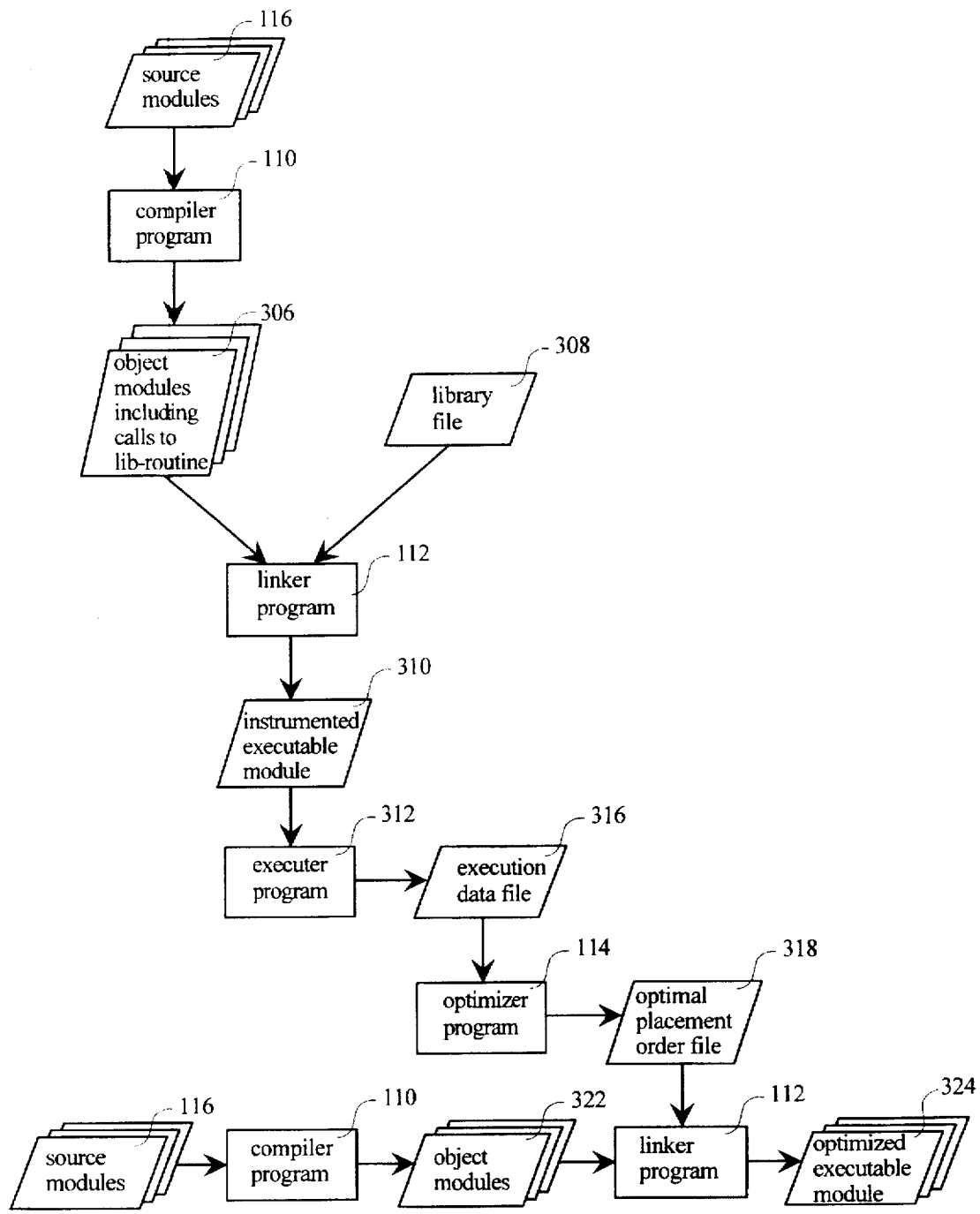
FIG. 3 is a functional block diagram of the method described in the overview flow diagram of FIG. 2.

FIG. 2 is an overview flow diagram of a method for determining an optimal placement order for code portions within the source module 116 and then reordering the code portions according to the determined optimal placement order to produce an optimized executable module in accordance with a preferred embodiment of the present invention. This overview flow diagram will be explained with reference to a functional block diagram as shown in FIG. 3. In step 202 of FIG. 2, the source modules 116 are compiled and linked to produce an instrumented executable module 310. To produce the instrumented executable module 310, the source modules 116 are input into the compiler program 110 to produce instrumented object modules 306. The instrumented object modules 306 preferably include instrumentation code in the form of calls to one or more library routines. While instrumentation code may be manually added to the source modules 116, in this preferred embodiment of the present invention the compiler program 110 automatically inserts a call to the library routine into each code portion while compiling the source module 116. A library routine is a routine stored in a library file that can be used by any program that can link into the library file. Library routines are typically used so that the same code does not have to be duplicated throughout the instrumented object module. In a preferred embodiment, the called library routines record execution data by setting a flag corresponding to a time interval when a code portion is invoked during that time interval. The recording of such execution data will be described in more detail below. Although the added instructions are preferably in the form of a call to the library routine, this is an optimization and not necessary to carry out the present invention. The call to the library routine is preferably inserted at the beginning of each code portion. The instrumented object modules 306 and a library file 308 containing the library routine are then input into the linker program 112 to produce an instrumented executable module 310. The linker program 112 places code portions into the instrumented executable module 310 in the order in which the code portions are encountered in the instrumented object modules 306 and the library file 308.

In step 204 of FIG. 2, the instrumented executable module 310 is executed on the computer system 100 of FIG. 1. As mentioned previously, during execution of the instrumented executable module 310, execution data is gathered for each code portion. In a preferred embodiment of the present invention, the instrumented executable module 310 is input into an executor program 312 to produce an execution data file 316. The executor program 312 executes the instrumented executable module 112 according to a programmed scenario. The scenario may take the form of an execution script that has a sequence of code portion calls. In an alternate embodiment of the present invention, a user may interactively develop a scenario for executing the instrumented executable module 310. The execution data file 316 contains execution information for each code portion, such as when in time each code portion is invoked.

Figures 4A, 4B:
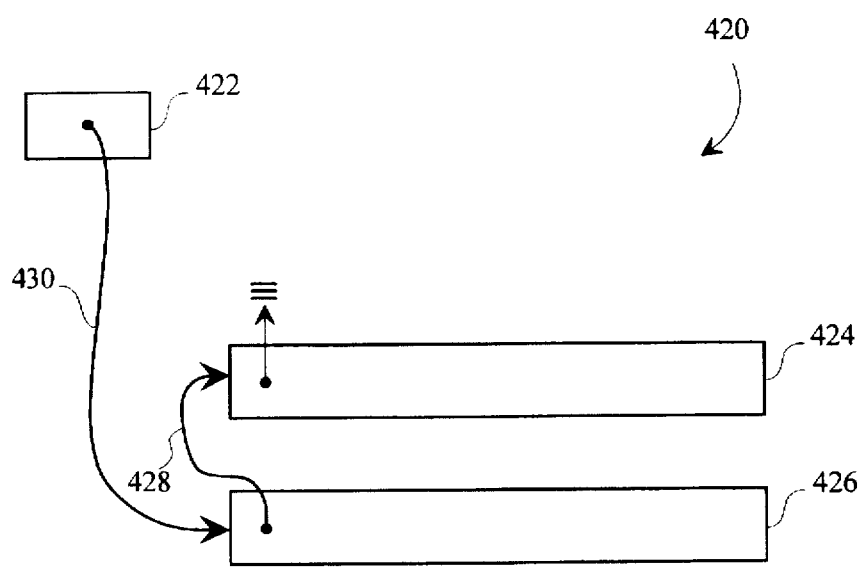
FIG. 4A is a block diagram of an illustrative bit vector table used to record execution data for code portions.
FIG. 4B is a block diagram of an alternate data structure for storing a bit vector.

During execution of the instrumented executable module 310, the library routine is invoked every time a code portion is invoked. The first time the library routine is invoked, an initialization function associated with the library routine is executed. The initialization function creates a bit vector table that is used to record when each code portion is invoked. FIG. 4A is a block diagram of an illustrative bit vector table 400. For this example, the source modules 116 include nine code portions - CP0, CP1, CP2, CP3, CP4, CP5, CP6, CP7, and CP8. Each row in the bit vector table 400 corresponds to one of the code portions. For example, row 402 corresponds to code portion CP0, and row 406 corresponds to code portion CP5. Each column of bits in the bit vector table 400 corresponds to one time interval. For example, column 404 corresponds to time interval T2 and column 408 corresponds to time interval T4. Each bit, that is, each intersection of a row and a column, represents a particular code portion during a particular time interval. All of the bits in the bit vector table 400 are initially set to 0. The initialization function may also create a code portion address table to keep track of which bit vector corresponds to each code portion. Each entry in a code portion address table would contain the starting address of a code portion and a pointer to the code portion's corresponding bit vector in the bit vector table.

In an alternate embodiment, instead of invoking the initialization function when the library routine is invoked for the first time, a modified initialization function may be invoked the first time each code portion is invoked. The modified initialization function would create a bit vector for a code portion only if the code portion is invoked during the scenario.

When implementing the present invention, the number and duration of time intervals used is a matter of user preference. In one embodiment of the present invention, 3200 time intervals are used, and each time interval has a duration of 1000 milliseconds. This permits a scenario lasting 3200 seconds, or over 53 minutes, to be executed. This is longer than typical execution scripts. If an execution script is longer, the time interval can be increased to more than 1000 milliseconds. The time interval of 1000 milliseconds effectively divides execution time into 1 second intervals so that it can be determined which code portions are executed or invoked during each second. Time intervals of 500 milliseconds, 1000 milliseconds, and 2000 milliseconds give similar optimizations.

As the time interval is increased beyond the range of 500–2000 milliseconds, some detail is lost and the optimization deteriorates. For example, if the time interval is equal to the length of time it took to execute a scenario, then the only information recorded is whether each code portion executed during the execution of the script. This information is helpfull, but not as much as knowing which code portions are executed together during each second. As the time interval is decreased below 1000 milliseconds, the optimization algorithm runs slower and requires more memory to execute, but no measurable improvement is detected in the resulting executable module.

In another embodiment of the present invention, rather than allocating a linear string of 3200 bits for each code portion, the bits are allocated in portions. Initially, one machine word, which is equal to 32 bits, is allocated to each code portion. Each bit within the word is set to 0. The first time a code portion is invoked, the word allocated to the code portion is located, all 0-bits are discovered, and then a first set of 128 bits is allocated to the code portion. A pointer to the first set of 128 bits is stored within the initial word. If the code portion should continue to need more than the initial allocation of 128 bits, then a second set of 128 bits is allocated to the code portion. A pointer to the first set of 128 bits is stored within the second set of 128 bits, and a pointer to the second set of 128 bits is stored within the initial word. FIG. 4B is a block diagram of a data structure 420 for storing a bit vector according to this alternate embodiment of the present invention. The data structure 420 includes a 32-bit portion 422, a first 128-bit portion 424, and a second 128-bit portion 426. The 32-bit portion 422 is initially allocated to a code portion. When the code portion is invoked for the first time, the first 128-bit portion 424 is allocated to the code portion and a pointer to the first 128-bit portion 424 is stored in the 32-bit portion 422. When the second 128-bit portion 426 is allocated, a pointer 428 to the first 128-bit portion 424 is stored within the second 128-bit portion, and a pointer 430 to the second 128-bit portion is stored within the 32-bit portion 422. This method of storing pointers alleviates the need to walk the entire chain of bits to locate the most recently allocated set of bits. With the allocation of each set of 128 bits, the time interval corresponding to the first bit set is also recorded.

This alternate scheme of allocating bits in portions has two important advantages. It permits experiments of any length of time as long as there is virtual memory to hold the bits, and bits are only allocated in small portions to those code portions that execute. Overall, this results in much less memory usage than a preallocation of 3200 bits. For ease in explanation, the remainder of this detailed description will refer to a "bit vector" as if it were a simple, linear set of 3200 bits.

Each time the library routine is invoked by a code portion, a bit within the bit vector table is set to 1. For example, code portion CP0 is invoked during time intervals T0, T2, T3, and T4. If code portion CP0 is invoked twice during a time interval, for example, time interval T2, then the third bit of the bit vector for CP0 is again set to 1. If code portion CP0 never executes during a given time interval, then its bit corresponding to that time interval is never set to 1, that is, the bit remains 0. If a code portion is called at least once during a time interval, then the corresponding bit of the code portion is set. If the code portion is called many times during a time interval the effect is the same as though the code portion were called only once. In a preferred embodiment, rather than recording how many times a code portion is executed during a time interval, the present invention records only whether a code portion is invoked during a time interval. This is because a code portion needs to be in memory during a given time interval whether the code portion is invoked once, or 10,000 times. Therefore, only the fact that a code portion is executed at all within a time interval needs to be recorded. The method used in a preferred embodiment of the present invention to locate and set a bit within the bit vector table will be described in more detail below with reference to FIG. 5.

After execution of the instrumented executable module 310 is completed and the execution data has been recorded, in step 206 of FIG. 2 the optimizer program analyzes the execution data to determine an optimal placement order for each code portion. The execution data file 316 is input into the optimizer program 114 to produce the optimal placement order file 318. The optimizer program 114 analyzes the bit vectors within the bit vector table to determine the optimal placement order for each code portion. The method used by the optimizer program 114 to determine optimal placement orders is described below in more detail with reference to FIGS. 6–11. The optimal placement order file 318 will be used by the linker program 112 to produce an optimized executable module 324.

In step 208 of FIG. 2, the source modules 116 are compiled to produce uninstrumented object modules 322. An uninstrumented object module is necessary so that instrumentation code is not included within the optimized executable module 324. To produce the uninstrumented object modules 322, the compiler program 110 is adjusted to suppress the addition of calls to the library routine. In step 210 of FIG. 2, the uninstrumented object modules 322 are lined by the liner program 112 to produce the optimized executable module 324. The linker program 112 places code portions into the optimized executable module 324 according to the optimal placement orders stored within the optimal placement order file 318.

Figure 5:
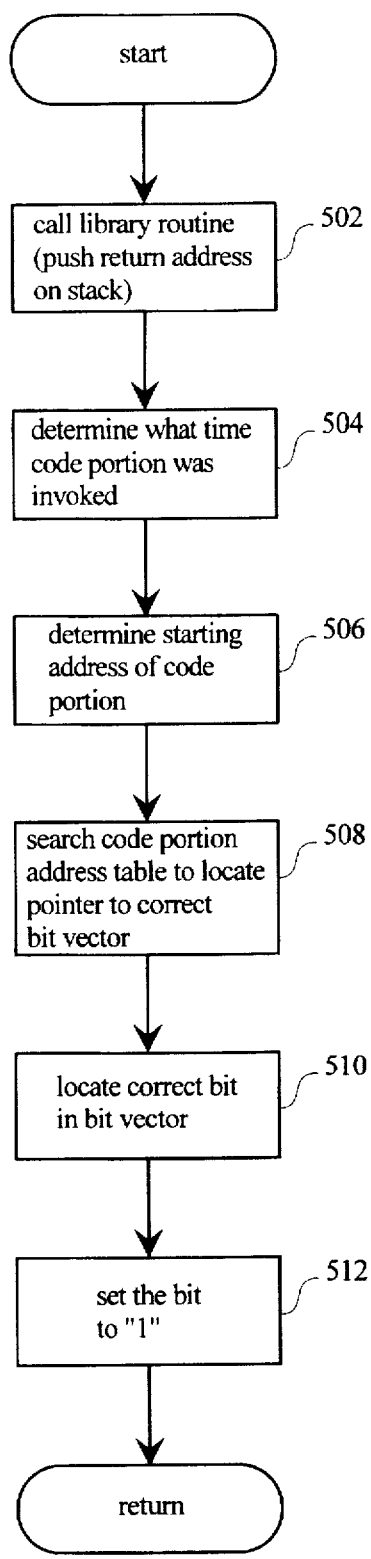
FIG. 5 is a flow diagram of a method used to locate and set a bit within the bit vector table of FIG. 4A in accordance with a preferred embodiment of the present invention.

As mentioned briefly above, FIG. 5 is a flow diagram of a method used to locate and set a bit within a bit vector table in accordance with a preferred embodiment of the present invention. The steps of FIG. 5 are performed after a code portion has recently been invoked and the first instruction executed is a call to the library routine. In step 502, the library routine is invoked and a return address is saved in a known location such as a stack. In step 504, the time at which the code portion was invoked is determined. In step 506, the starting address of the code portion is determined by reading the return address stored in the known location and then subtracting the length of the call instruction from this address. In step 508, a pointer to the correct bit vector is located by searching for the starting address of the code portion in the code portion address table. In step 510, the correct bit is located by determining in which time interval the code portion was invoked. The time interval is noted, so the last time interval used during execution of the scenario is known. In step 512, the correct bit is set to 1. After the bit is set, the return address is fetched from its known location and the remaining instructions within the code portion are executed.

Figure 6:
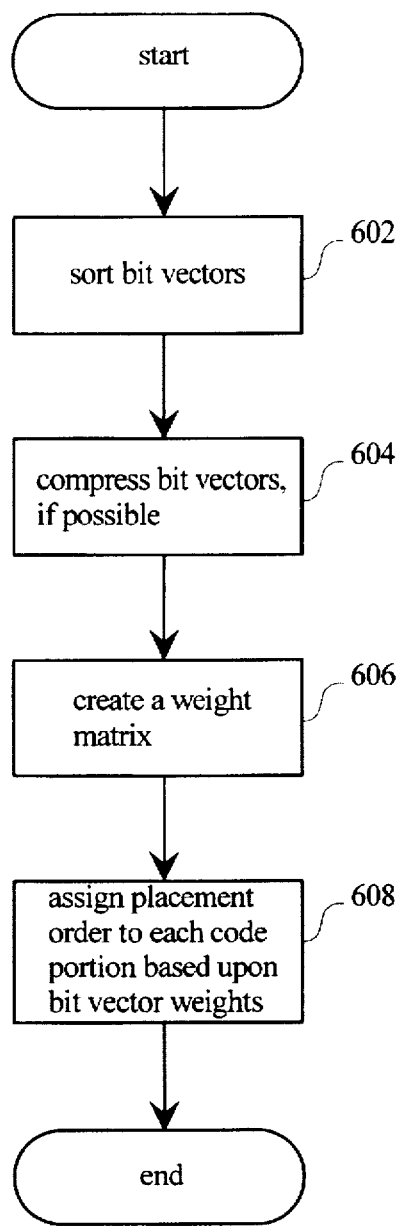
FIG. 6 is a flow diagram of a method for determining an optimal placement order for each code portion in accordance with a preferred embodiment of the present invention.

FIG. 6 is a flow diagram of the method used by the optimizer program 114 to determine a placement order for each code portion in accordance with a preferred embodiment of the present invention. The execution data file 316 containing the bit vector table 400 of FIG. 4A is input into the optimizer program 114. In step 602, the optimizer program sorts the bit vectors from largest to smallest as if they were binary numbers, with the T0-interval being the high order bit for the sort. FIG. 7 is a block diagram of a bit vector table 400' after the bit vectors in the bit vector table 400 of FIG. 4A have been sorted in accordance with a preferred embodiment of the present invention. In an alternate embodiment of the present invention, the order of code portions within the sorted bit vector table 400' may represent the optimal placement order for each code portion. This placement order would lessen the number of pages that make up the working set because the code portions would be ordered according to time and frequency of execution.

In step 604, the optimizer program attempts to compress the bit vectors in the sorted bit vector table 400'. Compression of the bit vectors is an optimization only and not essential to practicing the present invention. Compressing the bit vectors may significantly reduce the number of bits which must be considered during the remaining steps of this algorithm. As a first method of compression, trailing columns of 0-bits may be ignored, keeping in mind that every bit in an "ignored" column must be 0. This compression is accomplished by ignoring any bits beyond the last time interval used by any code portion during execution of the scenario. For example, referring to the bit vector table 400' of FIG. 7, the bits corresponding to time intervals T6 and T7 are all 0, therefore they will be ignored by the optimizer program. As a second method of compression, identical bit vectors are replaced by a single surrogate bit vector. For example, referring again to the bit vector table of FIG. 7, the bit vectors corresponding to code portions CP4, CP5, and CP8 are identical. To compress these identical bit vectors, a preferred embodiment of the present invention marks the last identical bit vector, in this example CP8, as a surrogate bit vector, and removes the preceding identical bit vectors, in this case CP4 and CP5. FIG. 8 is a block diagram of a bit vector table 400" containing a compressed version of the bit vector table 400' of FIG. 7. The bit vector table 400" contains bit vectors CP6, CP7, CP3, CP0, CP2, CP8, and CP1, and time intervals T0, T1, T2, T3, T4, and T5.

In step 606 of FIG. 6, the optimizer program creates a weight matrix, Weight [n,n], where n is equal to the number of bit vectors in a compressed version of the bit vector table. Using the illustrative bit vector table 400", which contains seven bit vectors, the optimizer program creates a 7×7 matrix. FIG. 9 is a block diagram of an illustrative weight matrix 900 for storing the computed weights for each bit vector. The diagonal matrix elements, Weight [i,i] contain the number of bits set in each bit vector i. The optimizer program uses the following formula to calculate each matrix element [i,j], when i is not equal to j.

Weight[i,j]=(A[i,j]*T*(S_max+1))+(S[j]*T)+(T−F[j]), where A[i,j]=the sum of the bits in the logical AND of bit vectors i and j, T=the number of time intervals, S[j]=the number of bits set to 1 in the bit vector j, $S_{max}$=the maximum number of bits set to 1 in any bit vector, and F[j]=the bit position of the first bit set to 1 in bit vector i. The above formula forms a three-part weight (each part being a separate addend of the weight formula) for each matrix element Weight[i,j], each part being successively less influential on the overall weight of a matrix element than its preceding part. The three parts are separated numerically so that the largest value of a less influential part cannot be more important than the smallest value of a more influential part. This is accomplished by multiplying the first, most influential part by $(T*(S_{max}+1))$, and the second, next most influential part by T.

The most influential part of the weight equation is the affinity, A[i,j], between bit vectors i and j. The affinity is the logical AND of the bit vectors i and j. The affinity reflects the extent to which code portion i and code portion j were executed at the same time and hence need to be in memory at the same time, since it is the number of bits of their respective bit vectors that overlap in time. The next most influential part of the weight equation is the number of bits set to 1 in the code portion j. The least influential part of the weight equation is the bit position of the first bit set in the bit vector j. The weight formula is constricted so that, if possible, the most influential part, the affinity will drive the decisions about code portion placement.

Using the bit vectors in the bit vector table 400" of FIG. 8, the following values are computed:

| T = 6; | $S_{max}$ = 6; |
|---|---|
| F[CP6] = 1; | S[CP6] = 6; |
| F[CP7] = 1; | S[CP7] = 3; |
| F[CP3] = 1; | S[CP3] = 2; |
| F[CP0] = 1; | S[CP0] = 4; |
| F[CP2] = 1; | S[CP2] = 3; |
| F[CP8] = 2; | S[CP8] = 3; |
| F[CP1] = 3; | S[CP1] = 4; |

| A[i,j] | CP6 | CP7 | CP3 | CP0 | CP2 | CP8 | CP1 |
|---|---|---|---|---|---|---|---|
| CP6 | 6 | 3 | 2 | 4 | 3 | 3 | 4 |
| CP7 | 3 | 3 | 2 | 2 | 1 | 1 | 1 |
| CP3 | 2 | 2 | 2 | 1 | 1 | 1 | 0 |
| CP0 | 4 | 2 | 1 | 4 | 3 | 1 | 3 |
| CP2 | 3 | 1 | 1 | 3 | 3 | 1 | 2 |
| CP8 | 3 | 1 | 1 | 1 | 1 | 3 | 2 |
| CP1 | 4 | 1 | 0 | 3 | 2 | 2 | 4 |

The above computed values are used to calculate the matrix elements, Weight[i,j]. For example, if i is CP8 and j is CP2, Weight[CP8,CP2] is calculated to be $= (A[CP8,CP2] * T * (S_{max} + 1)) + (S[CP2] * T) + (T − F[CP2]),$
$= (1 * 6 * 7) + (3 * 6) + (6 − 1)$
$= 42 + 18 + 5$
$= 65.$ This value is shown as matrix entry 902 in the weight matrix table 900 of FIG. 9. Each of the other matrix entries are similarly computed.

When assigning a placement order to each code portion, the preferred embodiment of the present invention selects a first code portion and then attempts to select a second code portion that is most likely to be invoked during the same time period as the first code portion. Assuming the first code portion is i, and two code portions j and k have equal affinities with i (i.e., A[i,j]=A[i,k]), then the next most influential part of the weight formula is determinative, namely, how many bits are set in j versus how many bits are set in k (i.e., S[j] vs. S[k]). The number of bits set represents how important it is to have that code portion in memory. If both of those conditions are the same (i.e., S[j]=S[k]), then the next most influential part of the weight formula is determinative, that is, which code portion was accessed first in time (i.e., F[j] vs. F[k]). This method of selecting code portions tends to pack code portions in the order in which they are accessed in time. To see why this is important, note that if this were not done, code portions with only one bit set would be assigned orders at random; instead they are assigned orders according to when they are invoked in time. If both j and k were first accessed during the same time interval, both j and k have the same number of bits set, and both j and k have equal affinities with code portion i, then Weight[i,j]=Weight[i,k]. In this case, conditions which arise during the processing of the weight matrix 900 will break the tie, as indicated in the following description of the algorithm.

In step 608 of FIG. 6, the optimizer program assigns a placement order to each code portion. In general, the algorithm used by the optimizer to assign a placement order to each code portion is as follows: first, the code portion with the most bits set is located. This code portion is selected and assigned the first placement order. The code portion that has the highest weight with the newly selected code portion is then located. This code portion is selected and assigned the next placement order, if it is has not already been assigned a placement order. The code portion that has the highest weight with the newly selected code portion is then located. This code portion is selected and assigned the next placement order, if it is has not already been assigned a placement order, and so on. The algorithm proceeds in this fashion until there is only one code portion not placed, and then that code portion is assigned the last placement order. This algorithm is described in more detail with reference to FIGS. 10 and 11.

Figure 10:
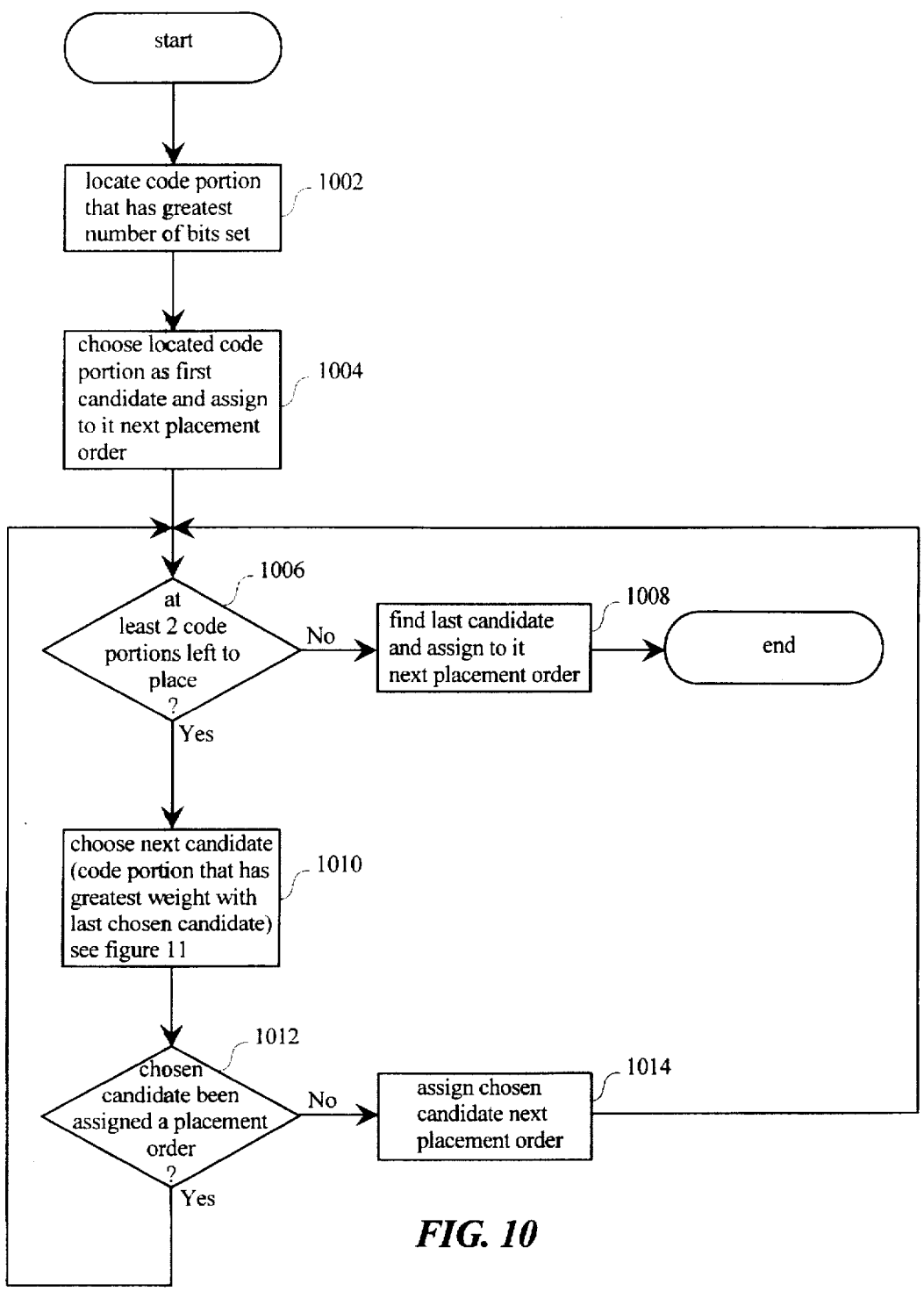
FIG. 10 is a flow diagram of a method for processing the weight matrix of FIG. 9 to assign a placement order to each code portion in accordance with a preferred embodiment of the present invention.

FIG. 10 is an overview flow diagram of a method for processing the weight matrix 900 to determine an optimal placement order for each code portion in accordance with a preferred embodiment of the present invention. In step 1002, the optimizer locates a code portion having the greatest number of bits set. In step 1004, the optimizer chooses the located code portion as a candidate for placement and assigns the located code portion the next available placement order. In step 1006, the optimizer determines whether at least two code portions exist that have not yet been assigned placement orders. If at least two unassigned code portions exist, then in step 1010 the optimizer chooses the next candidate for placement. The next candidate for placement is the code portion that has the greatest weight with the last code portion chosen as a candidate for placement. The method used in a preferred embodiment to choose the next candidate for placement is described below in more detail with reference to FIG. 11 and Table B.

After choosing the next candidate for placement, in step 1012 the optimizer determines whether the code portion chosen as the next candidate for placement has already been assigned a placement order. If so, then the optimizer loops back to step 1006. If the code portion chosen as the next candidate for placement has not already been assigned a placement order, then in step 1014 the optimizer assigns that code portion the next available placement order.

Referring back to step 1006, the optimizer determines whether at least two code portions exist that have not yet been assigned placement orders. If not, that is, if only one code portion has not yet been assigned a placement order, then in step 1008 the optimizer assigns the last placement order to that code portion. The processing of the weight matrix ceases after the last code portion has been assigned a placement order.

The pseudo code shown below in Table A provides more detail for the process described above with reference to FIG. 10. Comments within the pseudo code indicate the specific decisions being made at each point.

TABLE A

```
// Indicate how far back in memory we should look when considering affinity
Horizon = 1.5 * sizeof(page)
// Find the code portion with the most bits set, and then select it.
MaxWeight = -1
for (fun = 0; fun < N; fun++)
{
        // Indicate each code portion is a candidate to be selected
        // This will help us to remember whether this code portion
        // has been selected or not
        Candidate[fun] = 1
        // now check to see if this code portion is the one with the most bits set
        if ( Weight[fun, fun] > MaxWeight && Candidate[fun])
        {
             CurCandidate = fun
             MaxWeight = Weight[fun, fun]
        }
}
// We have a candidate which we will place as the first code portion in the module
LastChosen = CurCandidate
LastReallySelected = CurCandidate
Candidate[CurCandidate] = 0
Order[0]= CurCandidate
LastByte = Size[CurCandidate]
NumSelected = 1
NumCandidates = N-1
// Proceed as follows with remaining selections:
WHILE (NumCandidates > 1)
{
        // Get a candidate, based on weight
        LastChosen = ChooseNext( LastChosen, LastReallySelected)
        if ( Candidate[LastChosen])
        {
                // This code portion is still a candidate (has not been selected)
                // so select it now. First note its byte position in the module.
                FirstByte[LastChosen] = LastByte
                LastByte += Size[LastChosen]
                // Note this code portion is the next one to go into the module
                Order[NumSelected ++] = LastChosen
                LastReallySelected = LastChosen
                B1
                NumCandidates-
        }
}
if (NumCandidates =1)
{
        // Only one candidate remains to be selected: find it
        for (i = 0; i < N; i++)
        {
                if (Candidate[i])
                {
                // This is the one not yet selected: select it
                        Order[NumSelected] = i
                }
        }
}
```

Figure 11:
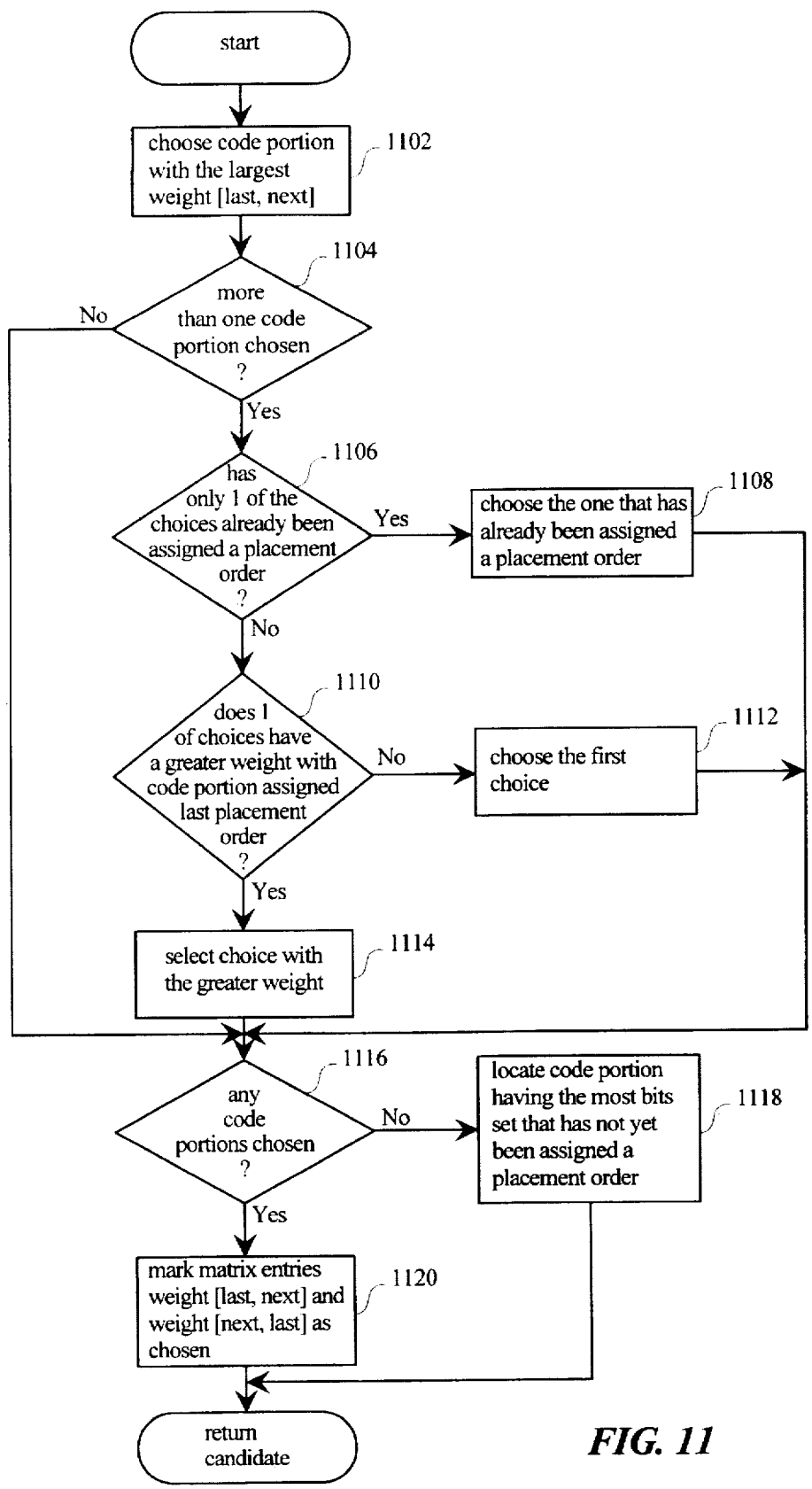
FIG. 11 is a flow diagram of a method for determining a next candidate for placement in accordance with a preferred embodiment of the present invention.

FIG. 11 is a detailed flow diagram of a method for choosing a next candidate for placement. The previously chosen code portion is called Last, and the code portion to be chosen is called Next. In step 1102, the optimizer searches for a code portion Next having the largest weight with Last. If the optimizer locates more than one code portion having the largest weight with Last, then a tie has occurred. In steps 1104–1114, ties are considered.

In steps 1106 and 1108, if one of the tied code portions has already been assigned a placement order, then that code portion is chosen as the next candidate for placement. This is because if a code portion is already "in physical memory", then that code portion is more influential than a code portion which is still "in secondary memory". If neither of the tied code portions has been assigned a placement order, or both have, then in steps 1110 and 1114 if one of the tied code portions has a greater weight with the code portion which is currently at the end of the placement order, then that code portion is chosen as the next candidate. In step 1112, an arbitrary selection of the first tied code portion is made because there is no further criteria of interest to use to break the tie. An arbitrary selection is made because the tied code portions are considered to be equivalent for the purposes of assigning a placement order. In steps 1116 and 1118, if the optimizer has not chosen a code portion because every possible choice failed to pass the criteria set forth in step 1102, then the diagonal of the weight matrix 900, i.e., S[j], is searched for the code portion with the largest number of bits set which has not yet been assigned a placement order. In step 1120, the matrix entries Weight[Last,Next] and Weight[Next,Last] are marked as chosen by negating the weights. If Weight[Last,Next]=0, however, Weight [Last, Next] and Weight [Next,Last] are set to −1 to account for the lack of a binary representation of −0.

The pseudo code shown below in Table B provides more detail for the process described above with reference to FIG. 11. Comments within the pseudo code indicate the specific decisions being made at each point. The detailed rationale for these decisions is described in the descriptions of the above steps.

TABLE B

```
// The function ChooseNext finds the best element in the current row to pursue
// It searches for the maximum weight, but has some tie breakers to handle the
// cases when weights are tied. Once selected, weights are set to less than 0 to
// indicate this fact.
ChooseNext( LastChosen, LastReallySelected)
{
    GotCandidate = 0 // still searching
    // Walk across the LastChosen row, looking for a good candidate
    for ( fun = 0; fun < N; fun++)
    {
        // Ignore the diagonal of the matrix Weight,
        // we ourselves (LastChosen) are not a candidate
        if ( fun =LastChosen) continue
        if ( Weight[LastChosen, fun] >=0 &&
            !Candidate[fun]&&
            LastByte - FirstByte[fun] > Horizon)
        {
            // This code portion has been selected and is far away, so we won't
            // consider it any more. Indicate by setting its weight <0; if it is 0,
            // force it to −1
            if ( !Weight[LastChosen, fun]) Weight[LastChosen, fun] = 1
            Weight[LastChosen, fun] = −Weight[LastChosen, fun]
            Weight[fun, LastChosen] = −Weight[LastChosen, fun]
        }
        if ( !GotCandidate)
        {
            // We have not yet found a candidate for this LastChosen
            if ( Weight[LastChosen, fun] > 0)
            {
                // This is the first one to be chosen during this scan
                // of LastChosen's row
                MaxWeight = Weight[LastChosen, fun]
                CurrentCandidate = fun
                GotCandidate = 1
            }
        }
        else
        {
            // We have gotten at least one candidate for this LastChosen so far
            if ( Weight[LastChosen, fun] > 0)
            {
                // This one has not yet been selected from this edge
                if ( Weight[LastChosen, fun] > MaxWeight)
                {
                    // This one is better than our last choice
                    MaxWeight = Weight[LastChosen, fun]
                    CurrentCandidate = fun
                }
                else if ( Weight[LastChosen, fun] = MaxWeight)
                {
                    // This one is just as good as the last choice, so we need
                    // a way to break the tie
                    if (!Candidate[fun] && Candidate[CurrentCandidate]|
```

TABLE B-continued

```
                        Candidate[fun] && !Candidate[CurrentCandidate])
                    {
                        if (!Candidate[fun])
                        {
                            // Choose fun since it's been chosen
                            // before by some other path and thus is
                            // likely in memory
                            CurrentCandidate = fun
                        }
                    }
                    else if ( |Weight[LastReallySelected, fun]| >
                             |Weight[LastReallySelected, CurrentCandidate]|)
                    {
                            // Choose fun: it's tied more to the
                            // last one really selected
                            CurrentCandidate = fun
                    }
                }
            }
        }
    }
    if ( !GotCandidate)
    {
                    // There is no candidate reachable from here: restart the search:
                    // return the candidate with the largest diagonal
                    MaxWeight = -1
                    for (fun = 0; fun < N; fun ++)
                    {
                        if ( Weight[fun, fun] > MaxWeight && Candidate[fun])
                        {
                            CurrentCandidate = fun
                            MaxWeight = Weight[fun, fun]
                        }
                    }
                    return CurrentCandidate
    }
    // Mark this LastChosen->CurrentCandidate as selected.
    // Indicate by setting its weight < 0; if it is 0, force it to -1
    if (!Weight[LastChosen, CurrentCandidate])
    {
        Weight[LastChosen, CurrentCandidate] = 1
        Weight[ LastChosen, CurrentCandidate] =-Weight[LastChosen, CurrentCandidate]
        Weight[ CurrentCandidate, LastChosen ]=-Weight[ LastChosen, CurrentCandidate]
    }
    // return the current candidate
    return CurrentCandidate
}
```

As an optimization of the above-described method for choosing a next candidate for placement, if a code portion that has already been assigned a placement order is chosen as the next candidate for placement, the optimizer determines whether the assigned placement is within a certain number of bytes from the last byte assigned. This "distance back" is known as the horizon. The horizon is the distance back in the placement order, beyond which code portions will not be considered when choosing a code portion having the greatest weight with the last candidate for placement. As each code portion is assigned a placement order, its size in bytes is added to a total size, which is the current size of all the code portions that have been assigned placement orders. This optimization is included within the pseudo code of Table B.

Suppose the optimizer has recently chosen code portion i as a candidate for placement. When choosing the next candidate for placement, the optimizer determines that code portion j has the greatest weight with code portion i. However, code portion j has already been assigned a placement order. Using the above described optimization, the optimizer determines whether code portion j is assigned a placement order that causes code portion j to be further back than (LastByte - horizon), then the optimizer will not choose code portion j as the next candidate. This optimization prevents the optimizer from having to scan the entire matrix and repeatedly choose candidates which have already been assigned a placement order. With this optimization, choice of the next candidate for placement depends not only on the weight of the next candidate with the last candidate, but also on the weight of the next candidate with all code portions assigned a placement order within the horizon. The value given to the horizon may be adjusted, but a setting of 1.5 pages is recommended. If the horizon is infinite, all code portions previously assigned a placement order are considered, with a cost in processing dependent on the size of the module. With a horizon of zero, only the code portion previously assigned a placement order is considered.

After discussing the methods used to process a weight matrix, it is helpful to illustrate the weight matrix 900 being processed. FIG. 12A is a block diagram of the weight matrix 900' after the first few steps of the weight matrix processing algorithm (see FIG. 10) are applied to the weight matrix 900 of FIG. 9. For this example, assume the size, in bytes, of each of the code portions is as follows: CP6=127, CP7=100, CP3=50, CP0=200, CP2=135, CP8=180, and CP1=75.

The optimizer locates the code portion having the greatest number of bits set (step 1002). In this example, the optimizer locates CP6, because CP6 has six bits set (i.e., S[CP6]=6). The optimizer chooses CP6 as the first candidate for placement and assigns CP6 the first placement order (step 1004). Because there are at least two code portions that have not been assigned placement orders (step 1006), the optimizer chooses the next candidate for placement (step 1010).

To choose the next candidate for placement, the optimizer searches the weight matrix 900 for the code portion having the greatest weight with the last chosen candidate (step 1102). In this example, CP6 is the last chosen candidate. The search is accomplished by starting at the beginning of row 904 in the weight matrix 900 and searching the entire row. CP0, having a weight of 197 with CP6 is chosen as the next candidate. The matrix entries Weight[CP6,CP0] and Weight[CP0,CP6] are negated to mark them as chosen (step 1120), resulting in the weight matrix 900a of FIG. 12A. The optimizer then determines whether the chosen candidate, in this example CP0, has already been assigned a placement order (step 1012). Because CP0 has not already been assigned a placement order, the optimizer assigns CP0 the second placement order (step 1014).

After assigning the first and second placement orders to code portions CP6 and CP0, respectively, the optimizer determines whether at least two code portions exist that have not already been assigned placement orders (step 1006). Because at least two code portions exist that have not already been assigned placement orders, the optimizer chooses the next candidate for placement (step 1010). To choose the next candidate for placement, the optimizer searches the weight matrix 900a for the code portion having the greatest weight with the last chosen candidate (step 1102). In this example, CP0 is the last chosen candidate. The optimizer searches row 906 in the weight matrix 900a for the largest matrix entry. The optimizer chooses CP1, having a weight of 153 with CP0, as the next candidate (step 1102). The optimizer then marks the matrix entries Weight[CP0,CP1] and Weight[CP1,CP0] as chosen by negating the weights (step 1120), resulting in the weight matrix 900b of FIG. 12B. Because CP1 has not already been assigned a placement order (step 1012), the optimizer assigns CP1 the third placement order (step 1014).

Following the above described steps, the optimizer chooses CP6 as the next candidate for placement, and marks Weight[CP1,CP6] and Weight[CP6,CP1] as chosen, resulting in the weight matrix 900c of FIG. 12C. Because CP6 has already been assigned a placement order (step 1012), another candidate for placement must be chosen. The optimizer searches row 908 in the weight matrix 900c for the largest matrix entry (step 1102). The optimizer chooses both CP2 and CP7, having equal weights of 149, as the next candidates (step 1102). Because more than one code portion is chosen (step 1104), the optimizer determines whether one of the choices has already been assigned a placement order (step 1106). Because neither CP2 nor CP7 has been assigned a placement order yet, the optimizer determines whether one of the choices has a greater weight with the code portion assigned the last placement order (step 1110). In this example, code portion CP1 was assigned the last placement order. Because CP2 has a weight of 107 with CP1, and CP7 has a weight of 65 with CP1, the optimizer chooses CP2 as the next candidate for placement (step 1114). The optimizer then marks Weight[CP6,CP2] and Weight[CP2,CP6] as chosen (step 1120), resulting in the weight matrix 900d of FIG. 12D. The optimizer then assigns code portion CP2 the fourth placement order (step 1014).

Following the above steps, the optimizer then assigns the fifth through the seventh placement orders to CP7, CP8 and CP3, respectively. FIG. 13A is a block diagram of the optimal placement order file 318 before decompression of surrogate code portions. At this time, the optimal placement order file 318 includes code portions CP6, CP0, CP1, CP2, CP7, CP8, and CP3. Once every code portion has been assigned a placement order, it is necessary to unpack the compression which is induced by using a surrogate code portion for other code portions with identical bit vectors. FIG. 13B is a block diagram of the optimal placement order file 318 after decompression of surrogate code portions. This is the final placement order for the code portions. Notice that CP4 and CP5, as well as CP8, have been inserted in the location that was previously occupied by the surrogate code portion CP8 (see compression discussion above with reference to FIG. 8).

Although the present invention has been described in terms of a preferred embodiment, it is not intended that the invention be limited to this embodiment. Modifications within the spirit of the invention will be apparent to those skilled in the art; the scope of the present invention is defined by the claims which follow.

We claim:

1. In a computer system, a method for ordering code portions that together non-redundantly comprise a single executable module, the method comprising the steps of:

executing the module on the computer system for a period of time;

defining within the period of time during which the module is executed a plurality of time intervals including a first and a second time interval;

during execution of the module, determining which of the code portions are invoked within the first interval and determining which of the code portions are indeed within the second time interval; and ordering the code portions within the module so that code portions determined to be invoked within the first time interval are placed within the module in close proximity to each other relative to code portions not determined to be invoked within the first time interval and code portions determined to be invoked within the second time interval are placed in close proximity to each other relative to code portions not determined to be invoked during the second time interval.

2. The method according to claim 1 wherein the step of determining which of the code portions are invoked within a first and a second time interval includes the steps of:

creating a bit vector for each code portion, each bit vector containing a first bit corresponding to the first time interval and a second bit corresponding to the second time interval;

upon invocation of a code portion within the first time interval, setting the first bit in the bit vector for the invoked code portion; and upon invocation of a code portion within the second time interval, setting the second bit in the bit vector for the invoked code portion.

3. The method according to claim 1 wherein the step of determining which of the code portions are invoked during a first and a second time interval includes the steps of:

inserting a call instruction to a library routine within the code portion so that when the code portion is invoked, the library routine is executed in addition to the code portion; and upon initialization of the library routine, creating a bit vector for each code portion, each bit vector containing a plurality of bits, each of the plurality of bits corresponding to a time interval; and upon invocation of the library routine by a code portion during a time interval, locating the bit vector for the code portion and setting the bit corresponding to the time interval.

4. In a computer system, a method for ordering code portions that together non-redundantly comprise a module, the method comprising the steps of:

creating a bit vector corresponding to each of the code portions, each bit vector including a plurality of bits, each bit corresponding to a common time interval in every bit vector;

executing the module on the computer system;
   during execution of the module on the computer system, upon invocation of one of the code portions within one of the time intervals,
   locating the bit vector corresponding to the invoked code portion,
   locating the bit within the located bit vector corresponding to the time interval in which the code portion was invoked, and
   setting the located bit;

subsequent to execution of the module on the computer system,
   determining a placement order for each code portion based upon which bits are set within each bit vector, and
   ordering the code portions within the module according to the determined placement order.

5. In a computer system, a method for ordering code portions that together non-redundantly comprise a single executable module to produce an optimized executable version of the module, the method comprising the steps of:

providing an instrumented executable version of the module, the instrumented executable version containing instructions within each code portion that, when executed, will cause execution information regarding the code portion to be recorded, the recorded execution information including when the code portion is invoked;

executing the instrumented executable version of the module to gather the execution information for each code portion;

analyzing the execution information to determine a desired placement order for each code portion, each code portion's desired placement order reflecting a desired physical location for the code portion within the module relative to the physical locations of the other code portions, by determining that code portions which are invoked at proximate times have proximate placement orders;

providing an original compiled version; and linking the original compiled version of the module according to the determined desired placement order for each code portion to produce an optimized executable version of the module.

6. In a computer system, a method for ordering code portions that together non-redundantly comprise a single executable module, the method comprising the steps of:

during compilation of the module, placing a call to a library routine within each code portion;

executing the module on the computer system for a period of time;

defining within the period of time during which the module is executed a plurality of time intervals;

during execution of the module on the computer system, invoking code portions,
   upon invocation of a code portion within a time interval, invoking the library routine,
   upon a first invocation of the library routine, invoking an initialization function for the library routine;
   upon invocation of the initialization function for the library routine,
   creating a bit vector table, the bit vector table including one bit vector corresponding to each code portion, each bit vector including a plurality of bits, each bit of every bit vector corresponding to the same unique time interval during the execution of the module, and clearing each bit in the bit vector table;
   upon every invocation of the library routine by a calling code portion during a time interval during the execution of the module,
   locating a bit vector corresponding to the code portion within the bit vector table,
   locating a bit within the located bit vector corresponding to the time interval, and
   setting the located bit;

ceasing execution of the module on the computer system;

subsequent to execution of the module on the computer system,
   sorting the bit vectors in the bit vector table,
   for each bit vector,
   determining whether any bit vectors are equivalent to the bit vector, and
   if any bit vectors are identical to the bit vector, replacing the bit vector with a surrogate bit vector and removing the identical bit vectors from the bit vector table;
   determining a placement order for each code portion based upon affinity; and
   ordering the code portions within the module according to the determined placement order.

7. In a computer system, a method of determining placement order of code portions that together non-redundantly comprise a single executable module in an executable, the method comprising the steps of:

providing a bit vector for each code portion wherein each bit vector includes a plurality of bits and each bit of every bit vector corresponds to the same time interval during the execution of the module;

executing the module on the computer system such that each time one of the code portion executes during one of the time intervals, setting the corresponding bit in the bit vector of the code;

examining the bit vectors to determine a placement position for a first of the code portions in the executable;

calculating property values of the bit vectors for other code portions relative to the bit vector of the first code portion; and using the calculated property values to determine which of the other code portions is placed next in the placement order of the executable after the first code portion.

8. The method of claim 7 wherein the step of calculating property values of the bit vectors for other code portions relative to the bit vector of the first code portion comprises the step for each of the other code portions, of calculating a logical AND between the bit vector of the first code portion and the bit vector of the other code portion to determine affinity between the code portions.

9. The method of claim 7 wherein the step of calculating property values of the bit vectors for other code portions comprises the step of counting a number of bits that are set in each of the bit vectors for the other code portions.

10. The method of claim 7 wherein the step of calculating property values of the bit vectors for other code portions comprises the step of calculating which bits in the bit vectors for the other code portions are set.

11. The method of claim 7 wherein the step of calculating property values of the bit vectors for other code portions comprises the step of determining a first bit in each of the bit vectors for the other code portions that is set.

12. The method of claim 7 further comprising the step of combining the calculated property values for each bit vector of the other code portions into a single value to simplify the step of using the calculated property values to determine which of the other code portions is placed next in the placement orders of the executable.

13. In a computer system, a method of determining placement order of code portions that together non-redundantly comprise a single executable module, said placement order comprising ordered portions, said method comprising the steps of:

providing a bit vector for each code portion, wherein each bit in every bit vector is associated with a time period during execution of the module and each bit is settable to indicate that the code portion was executed during the associated time period;

executing the module, each time a code portion is executed during the execution of the module, setting the bit of the bit vector for the code portion that is associated with the current time period;

calculating a weight matrix having entries from the bit vectors, each entry specifying a weight of a first bit vector for a first of the code portions with a weight for a second bit vector of a second of the code portions; and using the weights in the weight matrix to determine the placement order of the code portions in the executable.

14. The method of claim 13 wherein the step of calculating the weight matrix comprises the step for each entry of calculating a weight that quantifies merit in placing the first code portion in a next position in the placement order relative to other of the code portions given that a position in the placement order the second code portion has already been determined.

15. The method of claim 14 wherein the weight is calculated to quantify merit in placing the first code portion in the next position in the placement order relative to a last placed code portion.

16. The method of claim 14 wherein the step for each entry of calculating the weight further comprises the step of calculating the weight for each entry as a combination of component values, each component value associated with a property of the bit vectors of the code portions.

17. The method of claim 16 wherein the component values are disjoint such that each component value is not influenced by other component values.

18. The method of claim 17 wherein the component values are calculated to contribute to the weight in different degrees such that a component value of lesser degree cannot contribute to the weight more than a component value of greater degree.

19. The method of claim 14 wherein the step of using the weights in the weight matrix to determine the placement order of the code portions in the executable comprises the step of using only a predetermined portion of the weight matrix in determining placement order of each code portion to limit searching of the weight matrix to the predetermined portion.

20. A computer-readable medium for causing a computer system to order code portions that together non-redundantly comprise a single executable module by performing the steps of:

executing the module on the computer system for a period of time;

defining within the period of time during which the module is executed a plurality of time intervals including a first and a second time interval;

during execution of the module on the computer system, determining which of the code portions are invoked within the first interval and determining which of the code portions are indeed within the second time interval; and ordering the code portions within the module so that code portions determined to be invoked within the first time interval are placed within the module in close proximity to each other relative to code portions not determined to be invoked within the first time interval and code portions determined to be invoked within the second time interval are placed in close proximity to each other relative to code portions not determined to be invoked during the second time interval.

21. The computer-readable medium according to claim 20 wherein the step of determining which of the code portions are invoked within a first and a second time interval includes the steps of:

creating a bit vector for each code portion, each bit vector containing a first bit corresponding to the first time interval and a second bit corresponding to the second time interval;

upon invocation of a code portion within the first time interval, setting the first bit in the bit vector for the invoked code portion; and upon invocation of a code portion within the second time interval, setting the second bit in the bit vector for the invoked code portion.

22. A computer-readable medium whose contents cause a computer system to order code portions that together non-redundantly comprise a single executable module to produce an optimized executable version of the module by performing the steps of:

providing an instrumented executable version of the module, the instrumented executable version containing instructions within each code portion that, when executed, will cause execution information regarding the code portion to be recorded, the recorded execution information including when the code portion is invoked;

executing the instrumented executable version of the module to gather the execution information for each code portion;

analyzing the execution information to determine a desired placement order for each code portion, each code portion's desired placement order reflecting a desired physical location for the code portion within the module relative to the physical locations of the other code portions, by determining that code portions which are invoked at proximate times have proximate placement orders;

providing an original compiled version; and linking the original compiled version of the module according to the determined desired placement order for each code portion to produce an optimized executable version of the module.

23. A computer-readable medium whose contents cause a computer system to determine placement order of code portions that together non-redundantly comprise a single executable module, said placement order comprising ordered portions, by performing the steps of:

providing a bit vector for each code portion, wherein each bit in every bit vector is associated with a time period during execution of the module and each bit is settable to indicate that the code portion was executed during the associated time period;

executing the module;

each time a code portion is executed during the execution of the module, setting the bit of the bit vector for the code portion that is associated with the current time period;

calculating a weight matrix having entries from the bit vectors, each entry specifying a weight of a first bit vector for a first of the code portions with a weight for a second bit vector of a second of the code portions; and using the weights in the weight matrix to determine the placement order of the code portions in the executable.

* * * * *